United States Patent
Dean et al.

(10) Patent No.: US 8,175,875 B1
(45) Date of Patent: May 8, 2012

(54) EFFICIENT INDEXING OF DOCUMENTS WITH SIMILAR CONTENT

(75) Inventors: Jeffrey A. Dean, Palo Alto, CA (US); Sanjay Ghemawat, Mountain View, CA (US); Gautham Thambidorai, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 878 days.

(21) Appl. No.: 11/419,423

(22) Filed: May 19, 2006

(51) Int. Cl.
*G10L 15/06* (2006.01)
(52) U.S. Cl. .............................. 704/245; 704/9
(58) Field of Classification Search ............... 704/9, 245
See application file for complete search history.

(56) References Cited

U.S. PATENT DOCUMENTS

| | | | |
|---|---|---|---|
| 5,819,258 A * | 10/1998 | Vaithyanathan et al. | 707/2 |
| 6,611,213 B1 | 8/2003 | Bentley et al. | |
| 6,978,419 B1 * | 12/2005 | Kantrowitz | 715/209 |
| 7,366,718 B1 * | 4/2008 | Pugh et al. | 1/1 |
| 2002/0065857 A1 * | 5/2002 | Michalewicz et al. | 707/532 |
| 2005/0149473 A1 * | 7/2005 | Weare | 707/1 |
| 2006/0026128 A1 * | 2/2006 | Bier | 707/3 |

OTHER PUBLICATIONS

Lee et al., Duplicate detection for symbolically compressed documents, IEEE Sep. 1999, pp. 305-308.*
Charikar, M., et al., "Incremental Clustering and Dynamic Information Retrieval," SIAM J. Comput., vol. 33, No. 6, 2004, pp. 1417-1440.
Bentley, J., et al., "Data Compression Using Long Common Strings," Proceedings of IEEE Data Compression Conf., Mar. 1999, pp. 287-295.
Broder, A.Z., et al., "Syntactic Clustering of the Web," Computer Networks and ISDN Systems, vol. 29, 1997, pp. 1157-1166.
Charikar, M.S., "Similarity Estimation Techniques from Rounding Algorithms," Proceedings of 34th Annual ACM Symposium on Theory of Computing Table of Contents, Montreal, Quebec, Canada, May 19-21, 2002, pp. 380-388.

* cited by examiner

*Primary Examiner* — Jakieda Jackson
(74) *Attorney, Agent, or Firm* — Morgan, Lewis & Bockius LLP

(57) ABSTRACT

A set of documents may be stored and indexed as a compressed sequence of tokens. A set of documents are grouped into clusters. Sequences of tokens representing the clusters of documents are encoded to elide some repeating instances of tokens. A compressed sequence of tokens is generated from the compressed cluster sequences of tokens. Queries on the compressed sequence are performed by identifying cluster sequences within the compressed sequence that are likely to have documents that satisfy the query and then identifying, within these identified clusters, the documents that actually satisfies the query.

45 Claims, 10 Drawing Sheets

EFFICIENT INDEXING OF DOCUMENTS WITH SIMILAR CONTENT

TECHNICAL FIELD

The disclosed embodiments relate generally to information retrieval systems, and more particularly, to a scheme of indexing and storing documents with similar content.

BACKGROUND

Information retrieval systems, such as search engines, run queries against an index of documents generated from a document corpus (e.g., the World Wide Web). The document corpus may have groups of documents that, within each group, have similar content. For example, webpages from the same domain may have much text in common and/or use the same HTML code for their formatting. As another example, the document corpus may have documents that are exactly or almost the same with respect to content and may differ only in their timestamps and Uniform Resource Locators (URLs). Eliminating these duplicate or near-duplicates can help conserve storage space.

A typical strategy regarding duplicates or near-duplicates is to eliminate all but one copy of the duplicates or near-duplicates. Alternately, one of the duplicates or near-duplicates is identified as the representative or canonical instance of the document, and only that one copy of the document is indexed. As a result, the other copies or versions of the document are not accessible via the index. While these strategies help conserve storage space, they also have some drawbacks, particularly in the context of a webpage retrieval system. First, if the duplicates all have different URLs, then elimination of the duplicates may hinder retrieval of the stored copy when the requested URL corresponds to an eliminated duplicate. Another drawback is that it makes the retrieval system susceptible to page hijacking. Furthermore, this strategy is difficult to apply in practice to near-duplicates because of the difficulty in finding the optimal threshold degree of duplication for a document to be eliminated.

SUMMARY

Tokens are fixed or variable length objects, each of which represents a term, word, phrase, punctuation symbol, HTML tag or the like. After parsing, a set of documents is represented as a sequence of tokens in a tokenspace repository. Thus, a tokenspace repository stores documents as a sequence of tokens. In some embodiments, tokens all have the same fixed length (e.g., 32 bits). A tokenspace representation of a document can be very space efficient, because each word or term is represented by a single token, regardless of the number of letters or symbols in the word or term.

According to some embodiments, a method of processing documents includes grouping a set of documents into a plurality of clusters, the set of documents comprising a sequence of tokens, wherein each cluster includes one or more documents of the set of documents; generating a compressed sequence of tokens from the respective clusters; and generating a compressed sequence index of the compressed sequence of tokens, including indexing each token in the compressed sequence of tokens based on a respective token position of the respective token in the compressed sequence.

According to some embodiments, a method of processing a query includes receiving a query, the query comprising one or more tokens; identifying in a compressed sequence of tokens one or more cluster subsequences that each include at least one of the query tokens, each cluster subsequence corresponding to a respective cluster of documents; for at least one respective cluster subsequence of the identified cluster subsequences, identifying one or more documents within the respective cluster subsequence that satisfy the query; and returning the identified documents as matches to the query.

According to some embodiments, the aforementioned operations may be performed by a system including one or more modules with instructions to perform the aforementioned operations.

According to some embodiments, instructions for performing the aforementioned operations may be included in a computer program product.

BRIEF DESCRIPTION OF THE DRAWINGS

Like reference numerals refer to corresponding parts throughout the drawings.

DESCRIPTION OF EMBODIMENTS

Figure 1:
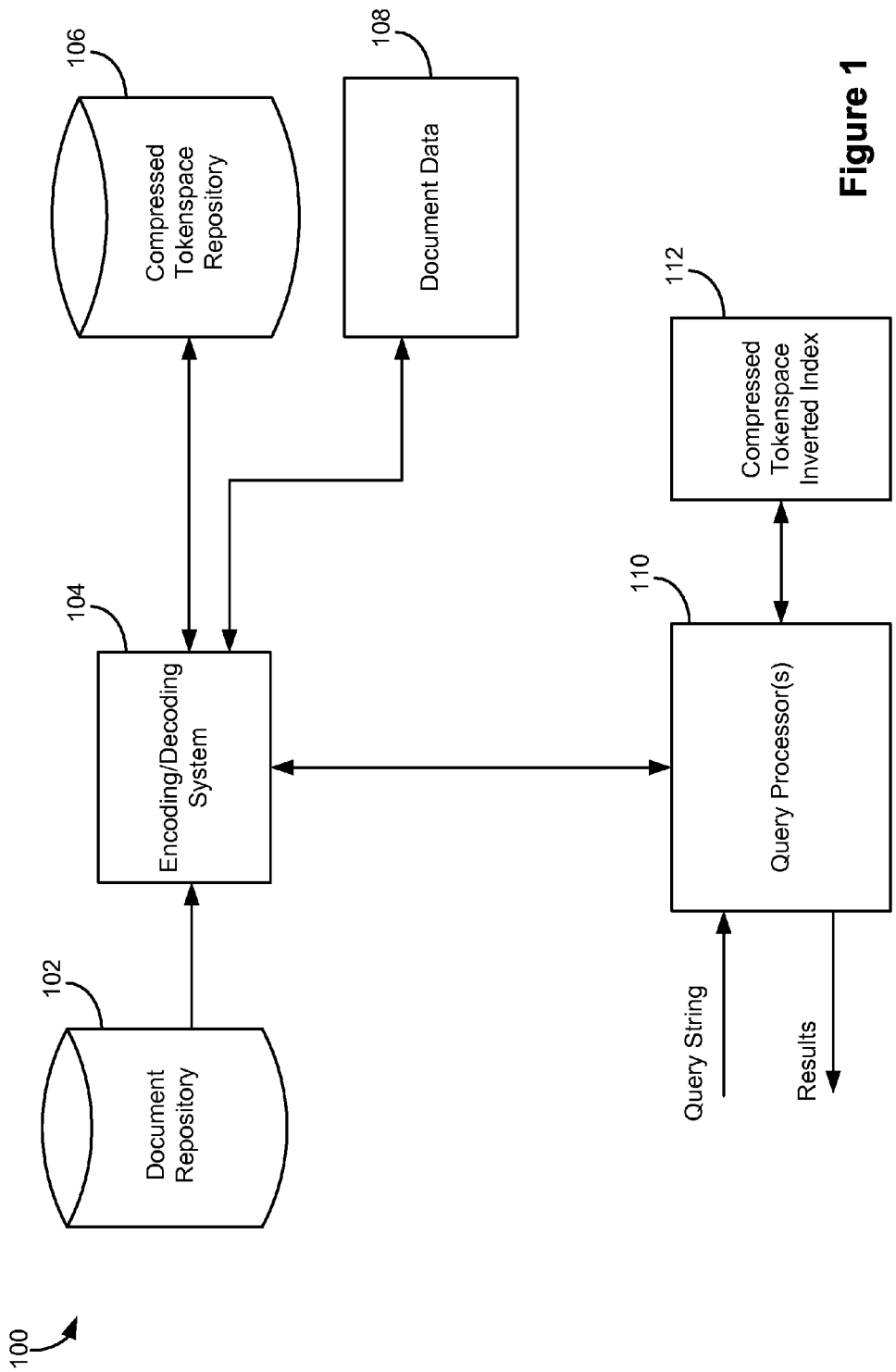
FIG. 1 is a block diagram illustrating an information retrieval system, in accordance with some embodiments.

FIG. 1 is a block diagram illustrating an information retrieval system, in accordance with some embodiments. The information retrieval system 100 includes an encoding/decoding system 104 and one or more query processors or query threads 110 (e.g., threads of execution within a single processor or group of processors). The encoding/decoding system 104 receives documents from a document repository 102 and populates a compressed tokenspace repository 106 with the documents. Documents in the document repository 102 may be documents, web pages, emails, application specific documents and data structures, instant messaging (IM) messages, audio files, video files, and any other data or applications that may reside on one or more computer systems. The write encoding/decoding system 104 also updates the compressed tokenspace repository 106 whenever updates to the document repository 102 occur.

The compressed tokenspace repository 106 stores the documents of the document repository 102 as a compressed sequence of tokens. As mentioned above, a "token" can be any object typically found in a document, including but not limited to terms (e.g., words), phrases, punctuation symbols, HTML tags and the like. After parsing, a set of documents is represented as a sequence of tokens. As discussed below, in some embodiments, the tokens all have the same fixed length (e.g., 32 bits). A tokenspace representation of a document can be very space efficient, because each word or term is represented by a single token, regardless of the number of letters or symbols in the word or term. Furthermore, each token in the sequence of tokens has a token position, which also represents the position of the token in the set of documents. For example, the first token in the set of documents may be assigned a position of 0, the second token in the set of documents may be assigned a position of 1, and so on.

A compressed sequence of tokens is a "compression" of the sequence of tokens that represents a set of documents as described above. For ease of understanding and explanation, the sequence of tokens prior to compression is hereinafter referred to as the "uncompressed" sequence of tokens. Alternately, this may be called the pre-compression sequence of tokens. Further details about the compression of a sequence of tokens are described below, in relation to FIG. 3.

The compressed tokenspace inverted index 112 indexes the tokens of the compressed tokenspace repository 106. The compressed tokenspace inverted index 112 maps tokens in the documents to their positions within the compressed tokenspace repository 106.

In some embodiments, the tokens in the repository are fixed-length tokens. For instance, every token may occupy exactly 32 bits (4 bytes). In other words, every term, symbol, tag and the like that has been mapped to a unique token is represented by a respective fixed-length token value in the tokenspace repository. As a result, when the compressed tokenspace inverted index 112 index specifies that a particular token is found in positions A, B and C (e.g., 1041, 12349 and 992345) in the compressed tokenspace repository 106, those positions in the repository can be accessed directly by treating the token positions as offsets from the start address of the repository in memory, and then accessing the resulting memory locations.

In some embodiments, each unique token (fixed-length or otherwise) may be mapped to a fixed-length global token identifier (or global token ID). For example, the global token ID may occupy exactly 32 bits (4 bytes). The global token IDs are mapped, in turn, to words, terms, punctuation symbols, and the like. In these embodiments, the tokens are stored in the repository are global token IDs and a separate lexicon maintains the mappings between the tokens and the global token IDs. For purposes of explaining the various aspects of the present invention, the embodiments described below use fixed length tokens in the tokenspace repository, with each unique token corresponding to a respective word, term, punctuation symbol or the like.

The query processors or query threads (i.e., threads of execution in a processor or group of processors) 110 perform queries on the compressed tokenspace repository 106. The query processors or threads 110 accept queries and return results of those queries. In some embodiments, the query processors or threads 110 parse a query into multiple query terms which are transformed by the query processor(s) 110 into a query expression (e.g., a Boolean tree expression). The query terms are used to retrieve token positions from a compressed tokenspace inverted index 112. In response to the query terms, the query processor(s) 110 generate an ordered list of documents, which are presented to the user via one or more modes of communication (e.g., display device, audio, etc.).

In some embodiments, the information retrieval system 100 may be distributed over a plurality of computers, such as servers. For example, the document repository 102 may be divided into a plurality of portions and each portion may be stored in its own compressed tokenspace repository 106, with each compressed tokenspace repository 106 residing on a separate server. Alternately, one or more of the servers may host a plurality of the compressed tokenspace repositories. Each document of the document repository 102 (and of the compressed tokenspace repository 106) may be globally identified within the information retrieval system 100 by a global document identifier and, within a portion, by a local document identifier.

The compressed tokenspace repository 106 is "compressed" because the sequence of tokens it stores is a subset of all of the tokens of the documents in the document repository 102. The "compressed" sequence of tokens is a "compression" of an "uncompressed" sequence of tokens that represent the documents in the document repository 102. The uncompressed sequence of tokens is compressed so that some repeated occurrences of tokens sequences within the uncompressed sequence are elided from storage in the compressed tokenspace repository 106. Further details about the compression are described below.

Figure 2:
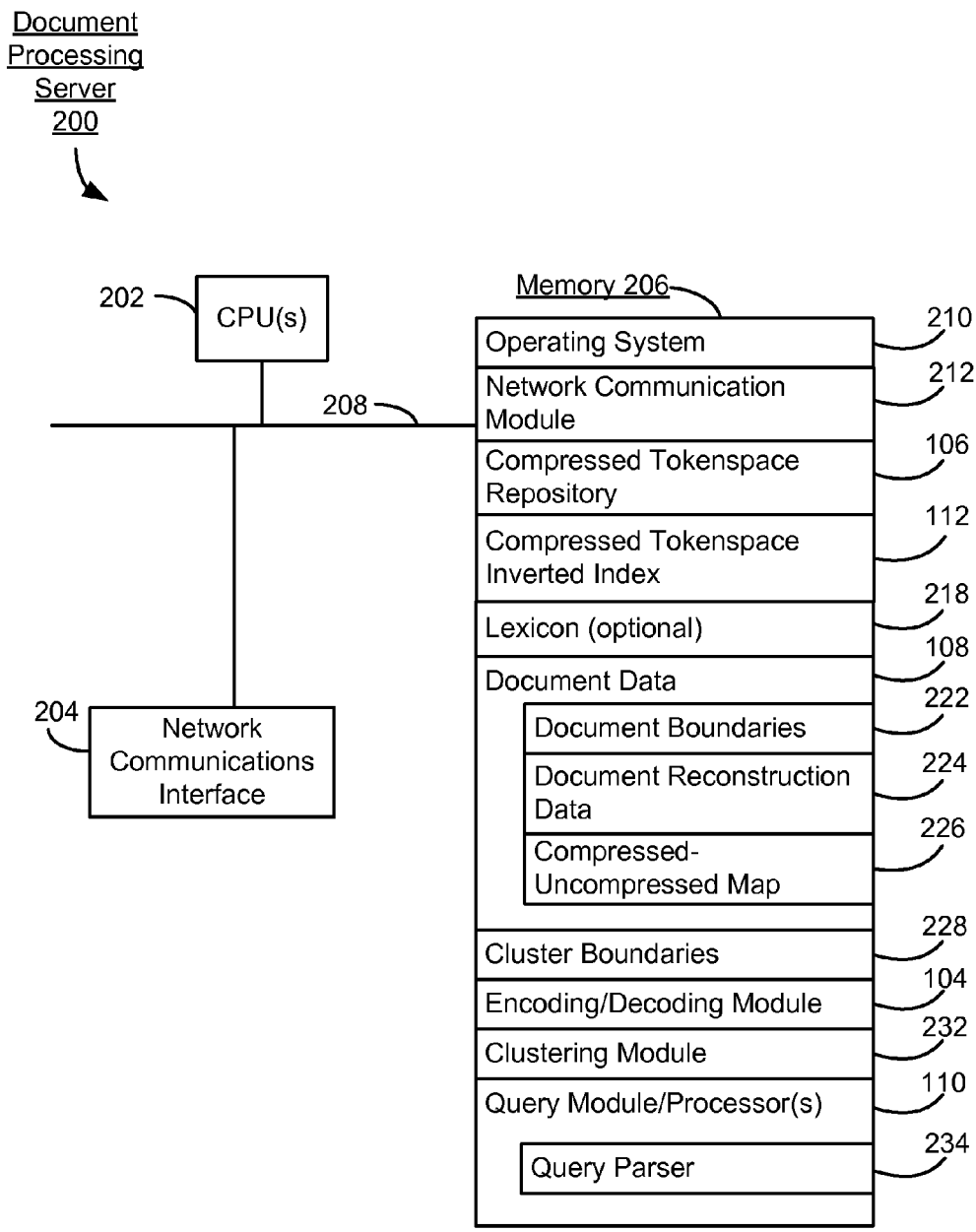
FIG. 2 is a block diagram illustrating a document processing server, in accordance with some embodiments.

FIG. 2 is a block diagram illustrating a document processing server, in accordance with some embodiments. The document processing server 200 typically includes one or more processing units (CPU's) 202, one or more network or other communications interfaces 204, memory 206, and one or more communication buses 208 for interconnecting these components. The document processing server 200 optionally may include a user interface comprising a display device and a keyboard/mouse (not shown). The memory 206 includes random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. In some embodiments, the memory 206 stores the following programs, modules and data structures, or a subset thereof:

- an operating system 210 that includes procedures for handling various basic system services and for performing hardware dependent tasks;
- a network communication module 212 that is used for connecting the document processing server 200 to other computers via the one or more communication network interfaces 204 (wired or wireless) and one or more communication networks, such as the Internet, other wide area networks, local area networks, metropolitan area networks, and so on;
- a compressed tokenspace repository 106 for storing documents as a compressed sequence of tokens;
- a compressed tokenspace inverted index 112 for mapping tokens to positions within the compressed tokenspace repository 106;
- an optional lexicon 218 for mapping unique tokens to global token identifiers;
- document data 108 for storing data regarding the documents that are stored in the compressed tokenspace repository 106;

cluster boundaries 228 for specifying token positions in the compressed tokenspace repository 214 that demarcate sequences of tokens representing clusters of documents;

an encoding/decoding module 104 for encoding documents, represented by uncompressed sequences of tokens, to compressed sequences of tokens, and for decoding compressed sequences of tokens to uncompressed sequences of tokens that represent documents;

a clustering module 232 for grouping documents into clusters; and a query module or processor(s) 110 for receiving and processing queries.

The document data 108 includes document boundaries 222, document reconstruction data 224, and a compressed-uncompressed map 226. The document boundaries 222 specify token positions in the compressed tokenspace repository 106 that demarcate tokens representing particular documents. The document reconstruction data 224 include instructions for reconstructing documents from the compressed tokenspace repository 106, as explained in more detail below. The compressed-uncompressed map 226 maps the positions of tokens in the compressed sequence of tokens in the compressed tokenspace repository 106 to corresponding positions in the uncompressed sequence of tokens.

The query module or processor(s) 110 includes a query parser 234 for parsing a query and identifying the tokens and operations included in the query.

In some embodiments, unique tokens may be mapped in the optional lexicon 218 to global token IDs, which are values of fixed length. In these embodiments, within the compressed tokenspace repository 106, the tokens are stored using the global token IDs rather than the tokens themselves.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows a "document processing server," FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a document processing server and how features are allocated among them will vary from one implementation to another, and may depend in part on the amount of data traffic that the system must handle during peak usage periods as well as during average usage periods.

Figure 3:
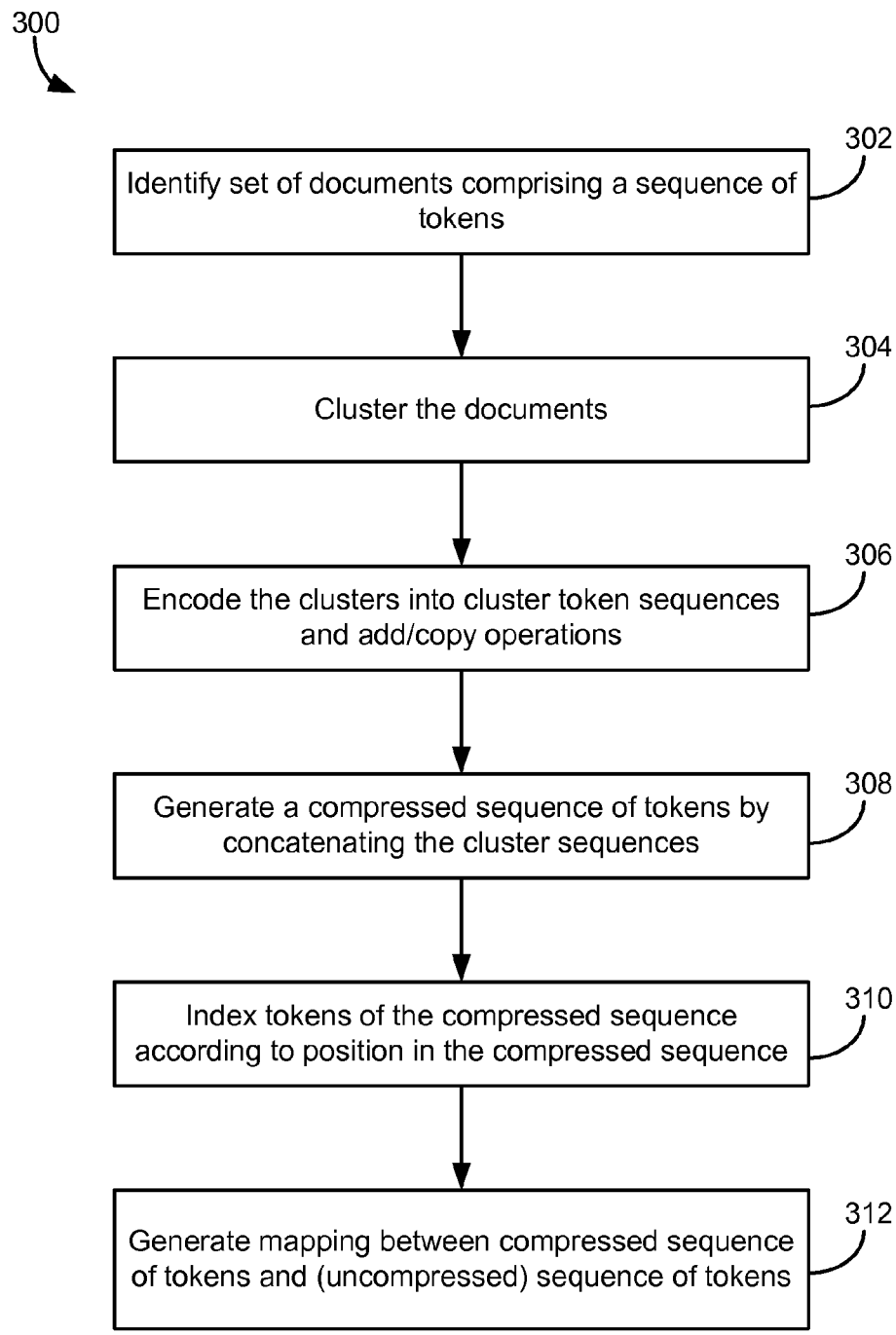
FIG. 3 is a flow diagram of a process for generating a compressed sequence of tokens and indexing the sequence, in accordance with some embodiments.

FIG. 3 is a flow diagram of a process for generating a compressed sequence of tokens and indexing the compressed sequence, in accordance with some embodiments. Process flow 300 illustrates a process of compressing an uncompressed sequence of tokens by eliding at least some repeating tokens from storage and indexing the compressed sequence.

A set of documents (the document corpus) is identified (302). Each document in the corpus contains a number of tokens. Any token may appear in more than one document in the corpus. Similarly, any token may appear multiple times within a document. The document corpus is parsed to identify all tokens within the document corpus. After parsing, the corpus is represented as an "uncompressed" sequence of tokens. In some embodiments, unique tokens are also mapped to global token IDs.

The documents in the corpus are grouped into clusters and the uncompressed sequence of tokens rearranged to group clustered documents (304). This groups documents that are more likely to have tokens in common together. A cluster may have one or more documents. In some embodiments, each of the document has an associated locator (e.g., a Uniform Resource Locator or URL), and the documents are grouped into clusters based on a lexicographic ordering of the locators of the documents. In such a lexicographic ordering, the domains of the document URLs are reversed and the protocol indicators are moved to the end. For example, the URL "http://www.yahoo.com/index.html" would be rewritten as "com.yahoo.www/index.html:http" for purposes of lexicographic ordering of the documents. After the documents are ordered based on the reversed URLs, the clusters may be chosen as sets of K consecutive documents from the ordering, where K may be any positive integer. In some embodiments, K is 10. In some other embodiments, K is a larger or smaller number. This ordering tends to group documents from the same sub-domain within the same domain. Such documents tend to have token sequences (such as boilerplate text) in common, and therefore make good candidates for clustering.

In some other embodiments, different versions of the same document from different times may be grouped together into a cluster. This clustering technique is particularly useful when the compressed tokenspace repository and the inverted index are used in a historical archive of varying versions of documents. In further other embodiments, the clustering may be performed using more complex techniques such as similarity-hashing techniques.

The clusters are encoded into cluster sequences of tokens (306). A cluster sequence of tokens for a cluster is the compression of the sequence of tokens representing the documents in the cluster. In some embodiments, the encoding utilizes the Bentley-McIlroy data compression method or a compression method similar to the Bentley-McIlroy data compression method. The Bentley-McIlroy data compression method is described in Jon Bentley and Douglas McIlroy, "Data compression using long common strings," Proceedings of the IEEE Data Compression Conference, March 1999, pp. 287-295, which is hereby incorporated by reference. Some embodiments of compression methods that are based on the Bentley-McIlroy data compression method are described in detail below, in relation to FIGS. 8-10.

In the encoding procedure, a sequence of tokens representing documents in a cluster is compressed such that some redundant tokens (that is, duplicates of tokens) may be elided from storage. The redundant tokens may be elided from storage because they can be copied from an earlier occurrence of the same tokens. Because the compression elides only tokens that are duplicates, the cluster sequence includes all unique tokens that appear in the documents in the corresponding cluster.

In some embodiments, only redundant token sequences of at least a predefined minimum length are eligible for elision from storage. That is, a sequence of consecutive tokens that is a repeat of a previous sequence of consecutive tokens is not elided from storage if it is shorter than the predefined minimum length. In some embodiments, the predefined minimum length N is twenty tokens. That is, only repeated sequences of twenty tokens or longer are eligible for elision from storage. In some other embodiments, N is a larger or smaller number than twenty.

The encoding generates, for a cluster, the cluster sequence and document reconstruction data for the cluster, which includes a plurality of Add and Copy codes. Each Add code includes a sequence of one or more literal tokens (e.g., a sequence of tokens) or refers to a sequence of one or more tokens in the cluster sequence. Each Copy code specifies a range of locations in the cluster sequence that is to be duplicated or copied to produce a decoded portion of a document. The Copy code may include a start position within the cluster sequence and a length, or it may indicate start and end positions.

A compressed sequence of tokens for the document corpus is generated by concatenating the cluster sequences of tokens into one long sequence of tokens (308). The compressed sequence of tokens for the document corpus is generated by combining the cluster sequences of tokens, each cluster sequence being a compression of a sequence of tokens formed by a cluster of documents from the document corpus. The compressed sequence is stored in the compressed tokenspace repository 106. The document reconstruction data for the clusters are combined to form the document reconstruction data for the document corpus. Position data within the Copy codes may be modified to conform to the positions of corresponding tokens in the compressed sequence.

Figure 7:
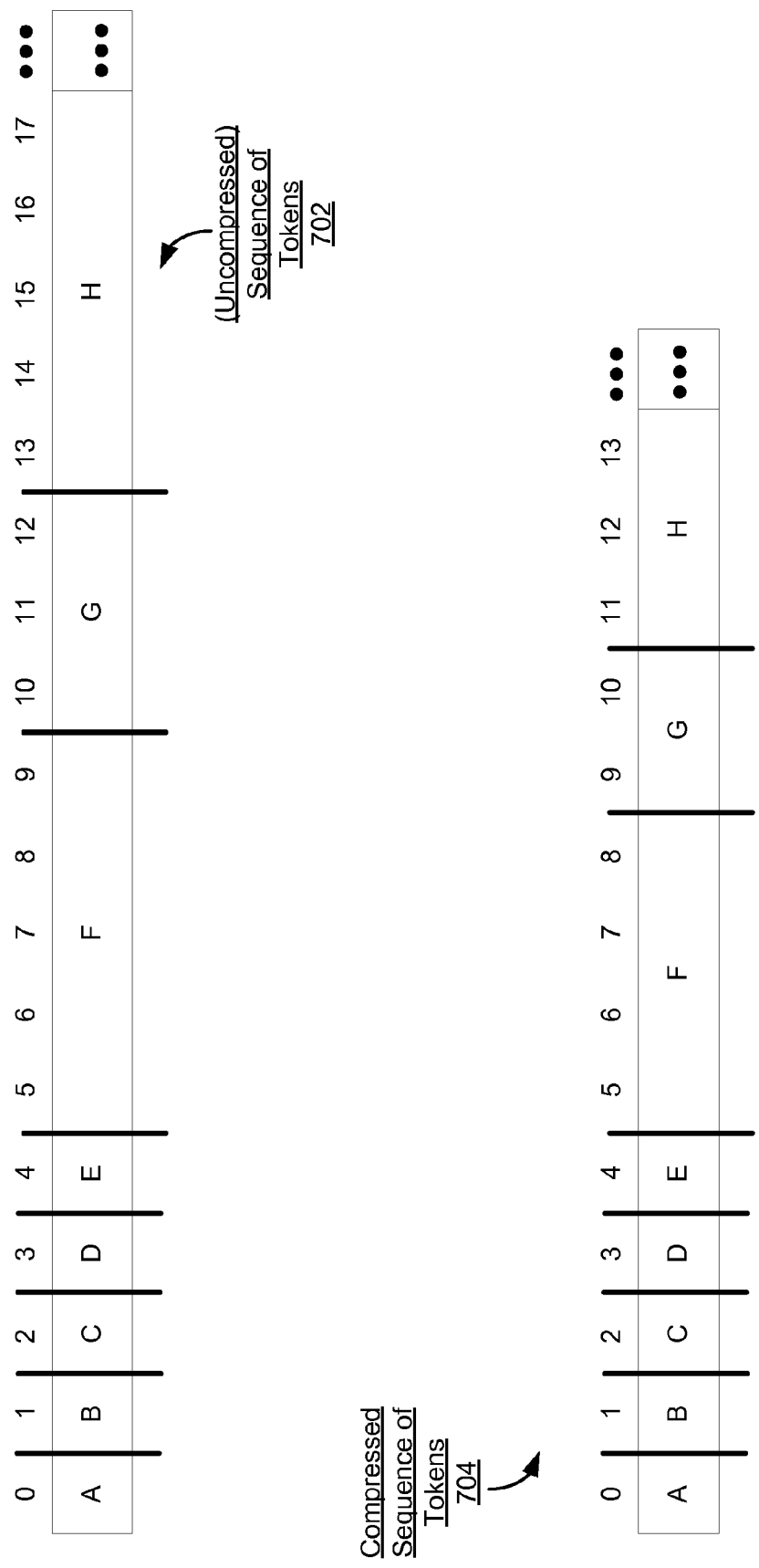
FIG. 7 is a diagram illustrating an uncompressed sequence of tokens and a compressed sequence of tokens, both of which include subsequences of tokens corresponding to single-document clusters, in accordance with some embodiments.

In some embodiments, in the compressed sequence of tokens, single-document clusters may precede multiple-document clusters. As shown in FIG. 7, the uncompressed sequence of tokens 702 is rearranged, to the extent such rearranging is needed, so as to put the tokens for the single-document clusters (e.g., clusters A through E) ahead of the multiple-document clusters (e.g., clusters F, G, H et seq.). The cluster sequences for single-document clusters include the single documents, without any elision of repeating tokens, and are placed in the compressed sequence 704 ahead of the clusters for the multiple-document clusters, in the same order as the order of clusters in the uncompressed sequence. This aligns the token positions in the compressed sequence of tokens 704 and the uncompressed sequence of tokens 702 for the single-document clusters. That is, for the documents in the single-document clusters, the token positions in the uncompressed space and the token positions in the compressed space are the same.

Tokens in the compressed sequence of tokens are indexed according to their token positions in the compressed sequence (310). A compressed sequence inverted index is generated, mapping tokens to positions in the compressed sequence.

A mapping between token positions in the compressed sequence and token positions in the uncompressed sequence is generated (312). The mapping maps, for each token in the compressed sequence, its position in the compressed sequence of tokens to one or more positions in the uncompressed sequence of tokens. The mapping from compressed sequence positions to uncompressed sequence positions may include one-to-many mappings because a token in the compressed sequence may correspond, due to the Copy codes, to a plurality of instances of the token in the uncompressed sequence. In some embodiments, a reverse mapping that maps positions in the uncompressed sequence to positions in the compressed sequence may also be generated.

In some embodiments, cluster boundary data, such as cluster boundaries 228, may be generated. This data identifies the positions in the compresses sequence that demarcate the cluster sequences within.

Figure 6:
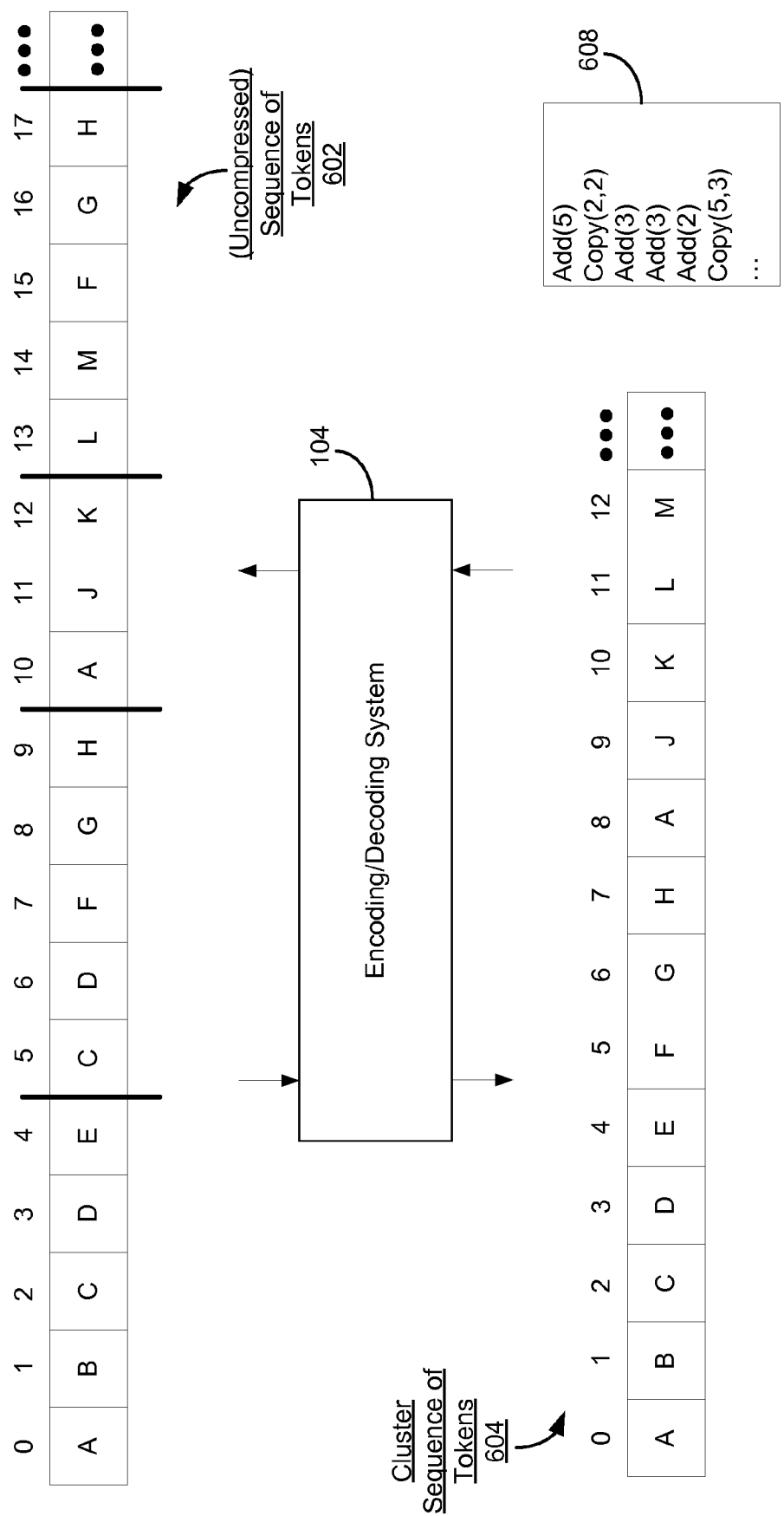
FIG. 6 is a diagram illustrating an uncompressed sequence of tokens and a compressed sequence of tokens, in accordance with some embodiments.

An example of the encoding of a sequence of tokens of documents in a cluster into cluster sequence of tokens is illustrated in FIG. 6. FIG. 6 shows a portion of an uncompressed sequence of tokens 602, which includes a plurality of blocks, each block corresponding to a token in a document. The portion shown corresponds to tokens of documents within a single cluster. The thick lines demarcate individual documents within the cluster and are shown for ease of understanding. Position numbers are also shown for ease of understanding. Thus, in the uncompressed sequence 602, tokens 0-4 correspond to a document, while tokens 5-9, 10-12, and 13-17 correspond to additional documents. For purposes of this example, the predefined minimum length N is 2 tokens.

The encoding/decoding system 104 encodes the uncompressed sequence 104 and generates a cluster sequence of tokens 604 and document reconstruction data 608. The document reconstruction data 608 includes a sequence of Add codes and Copy codes. Each Add code includes a sequence of one or more literal tokens (e.g., a sequence of tokens) or refers to a sequence of one or more tokens in the cluster sequence 604. Each Copy code specifies a range of locations in the cluster sequence 604 that are to be duplicated or copied to produce a decoded portion of a document. The Copy code may include a start position within the cluster sequence 604 and a length, or it may indicate start and end positions.

A number of tokens have been elided from the cluster sequence 604 as a result of the encoding. For example, tokens "CD" (positions 5-6) in the uncompressed sequence 602 are elided from the cluster sequence 604 because they can be copied from a previous occurrence of the same sequence of tokens, located in positions 2-3 in the cluster sequence 604. In the document reconstruction data 608, this is indicated by the "Copy(2,2)" instruction. "Copy(2,2)" indicates that 2 tokens are to be copied starting from position 2 in the cluster sequence 604.

Token "A," at position 10 in the uncompressed sequence 602 is not elided from the cluster sequence 604, appearing in position 8. This token is not elided because this token sequence has a length of 1, which is shorter than the minimum length N=2.

Tokens "FGH," at positions 15-17 in the uncompressed sequence 602, are elided from the cluster sequence 604. The document reconstruction data 608 includes a copy instruction "Copy(5,3)" to copy 3 characters starting from position 5 in the cluster sequence 608, which is a previous occurrence of the tokens "FGH."

In some embodiments, document boundary data such as document boundaries 222, is also generated by the encoding procedure. The document boundary data identifies the positions, within the cluster sequences or the compressed sequence, that demarcate documents. The document boundary data may be used to determine if a token is within a document or another. The document boundaries data may be stored separately from the document reconstruction data or integrated with the document reconstruction data.

Figure 4:
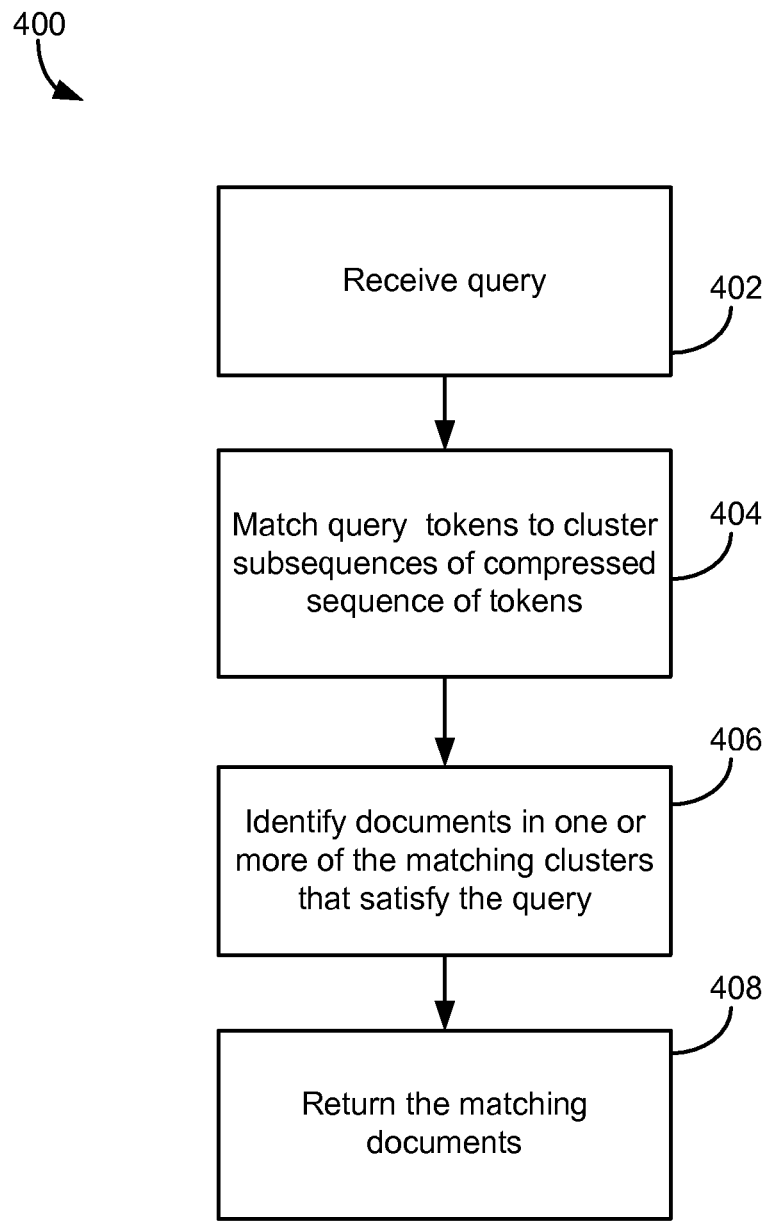
FIG. 4 is a flow diagram of a process for processing a query on a compressed sequence of tokens, in accordance with some embodiments.

FIG. 4 is a flow diagram of a process for processing a query on a compressed sequence of tokens, in accordance with some embodiments. Process flow 400 illustrates a process for processing a query, which includes one or more tokens and perhaps one or more operators, on the compressed tokenspace repository.

A query is received by the query processor(s) 110 (402). The query includes one or more tokens and perhaps one or more Boolean operators or other operators applied to the tokens. Boolean operators in any particular query may one or more of the following operators: "OR," "AND," and "NOT." In some embodiments, other operators are used in queries and those operators are identified by the query processor(s). Examples of such other operators include "near" (a token appearing within some "distance" from another token); "in_title:" (the token(s) must appear in the title of the document); "in_url:" (the token(s) must appear in the Uniform Resource Locator (URL) of the document); and the exact phrase operator, generally indicated by putting the applicable tokens in double quotation marks (the tokens must all appear in the order specified in the query, perhaps consecutively).

The query is parsed by the query processor(s) to identify the tokens and the operators. The query tokens are matched to cluster sequences of tokens within the compressed sequence of tokens (404). The compressed sequence of tokens is searched for occurrences of the query tokens. The positions of these occurrences within the compressed sequence and the cluster sequences (which are subsequences of the compressed sequence) corresponding to these occurrences are identified. In other words, cluster sequences that include the query tokens are identified as candidates for further consideration.

In some embodiments, depending on the operator(s) included in the query, a subset of the cluster sequences identified as having occurrences of the query tokens may be further singled out. For example, if the query is "google AND yahoo," then the cluster sequences that include both tokens "google" and "yahoo" are identified and singled out because cluster sequences that include either token but not both cannot satisfy the query. Similarly, if the query is "'I love you,'" then the cluster sequences that include all the tokens "I," "love," and "you" are identified. More generally, if the operator in the query is one that requires appearance of multiple tokens, then cluster sequences that do not include all of the multiple tokens may be eliminated from further consideration because no document in those clusters can satisfy the query.

Thus, in block 404, the cluster sequences that are more likely to have documents that satisfy the query are identified for further consideration. This narrows down the field of cluster sequences that are to be processed further, without decoding the compressed sequence into the corresponding uncompressed sequence.

For the cluster sequences identified in block 404, documents within the cluster sequences that actually satisfy the query are identified (406) and the identified documents are returned as matches to the query (408). Identification of documents that satisfy the query requires identifying the documents within the clusters (to which the cluster sequences correspond) that not only includes the tokens specified in the query, but also satisfies the operator(s) applied to the query tokens.

As noted above, some embodiments position some or all of the single document clusters (i.e., each of which has only a single respective document) at the beginning of the document repository, or at some other well defined portion of the repository. When a cluster sequence identified by operation 404, the process determines whether the identified cluster is a single document cluster. This may be determined by its location within the repository (e.g., the token positions of the matching tokens are all located at token locations within the single-document cluster portion of the document repository). If the identified cluster is a single document cluster, then there is no need to identify documents within the cluster, because the identified cluster has only one document.

Figure 5:
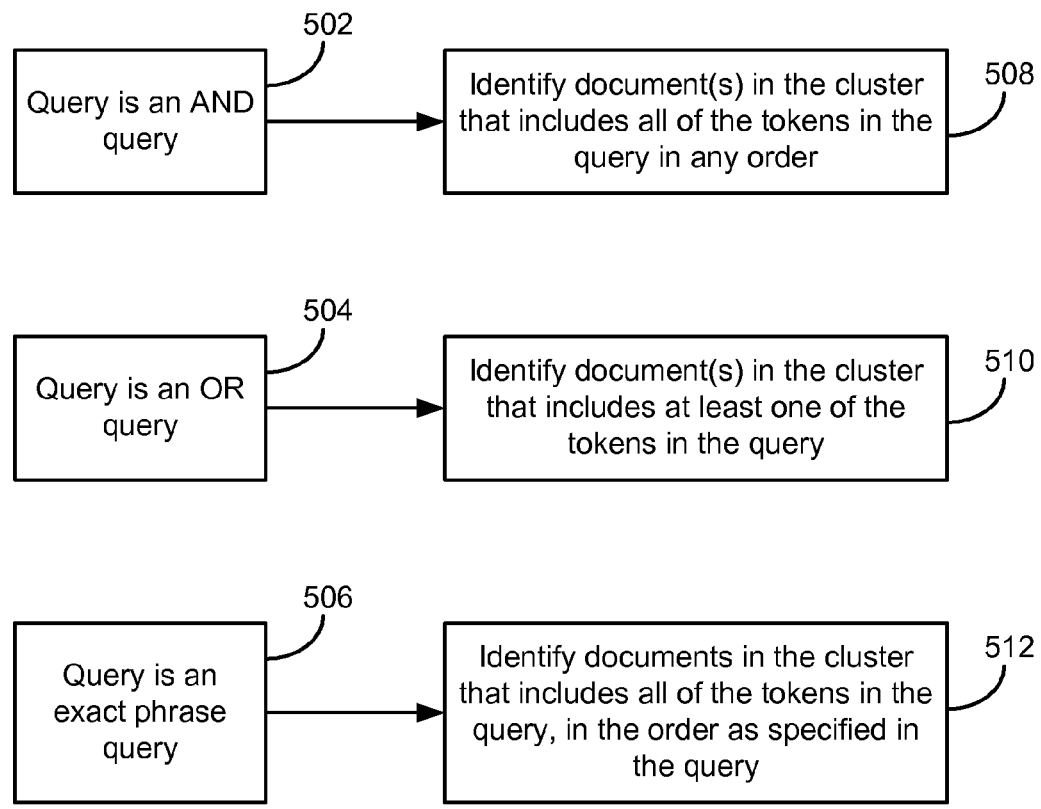
FIG. 5 illustrates different queries and matches for those queries, in accordance with some embodiments.

FIG. 5 illustrates examples of operators that may appear in queries and the criteria for identifying documents that satisfy such queries. If the query contains only a token and no operators, then the identification of the documents that satisfy the query involves simply identifying the documents in which the query token occurs. The positions in which the token occurs can be cross referenced with the document boundary data and, if necessary, the document reconstruction data and/or the compressed-uncompressed mapping, to find the documents that actually include the token.

If the query contains a plurality of tokens and a Boolean OR operator on the tokens (e.g., "google OR yahoo OR microsoft") (504), the identification of the documents involves identifying the documents in which at least one of the query tokens occurs (510); documents in which any one of the query tokens occur satisfies the query. The identification is similar to that of the single token query. The positions in which the token occurs can be cross referenced with the document boundary data and, if necessary, the compressed-uncompressed mapping, to find the documents that actually include any of the tokens to which a Boolean OR operator is applied. In some embodiments, a received query is converted into a Boolean expression of the query, which is represented by a tree or graph structure in which each Boolean operator of the Boolean expression is represented by a node in the tree or graph structure. The Boolean expression (A OR B OR C) may be represented by a single Boolean operator node, representing the OR operation, and a plurality of child nodes representing the tokens to which the Boolean OR operator is applied.

If the query contains a plurality of tokens and a Boolean AND operator on the tokens (e.g., "google AND yahoo AND microsoft") (502), the identification of the documents that satisfy the query involves identifying the documents in which all of the query tokens occur (508). The positions in which the token occurs can be cross referenced with the document boundary data and, if necessary, the compressed-uncompressed mapping, to find the documents that actually include all of the tokens operated upon by the AND operator.

If the query contains a plurality of tokens and an exact phrase operator on the tokens (e.g., "'i love you'") (506), identification of the documents that satisfy the query involves identifying the documents in which all of the query tokens occur and occur in the order specified in the query (512). Thus, a document with the phrase "you love i" does not satisfy the query unless it also includes the phrase "i love you." The positions in which the token occurs can be cross referenced with the document boundary data and, if necessary, the compressed-uncompressed mapping, to find the documents that actually include all of the tokens in the consecutive order specified in the query.

An exact phrase query can pose a challenge if a matching phrase occurs across a transition point between an Add code and a Copy code. That is, a part of the matching phrase contains literal tokens and another part of the phrase contains copied tokens.

In some embodiments, a solution to this challenge takes place at the encoding stage. At the encoding stage, the Copy codes may be shortened by some number of tokens on both ends, up to any phrase separators such as punctuation marks. This lengthens the literal token sequences (the Add codes) that are in the compressed sequence. While this does lessen the possibility that a matching phrase will span an Add code and a Copy code, it does not eliminate that possibility altogether.

An alternative solution may be applied at the query processing level. The phrase query can be split up into a query consisting of shorter phrases linked by the Boolean AND operator. Matching cluster sequences are identified using the modified query. Within the identified clusters, documents that actually satisfy the original query are identified using the compressed-uncompressed mapping.

More complicated queries, such as queries having combinations of AND and OR operators, "x near y" queries, and queries for tokens in the body or URL of a document, may be handled using the compressed-uncompressed mapping and the document reconstruction data, as well as the document boundaries.

First Embodiment of Bently-McIlroy-Based Compression Process

Figure 8:
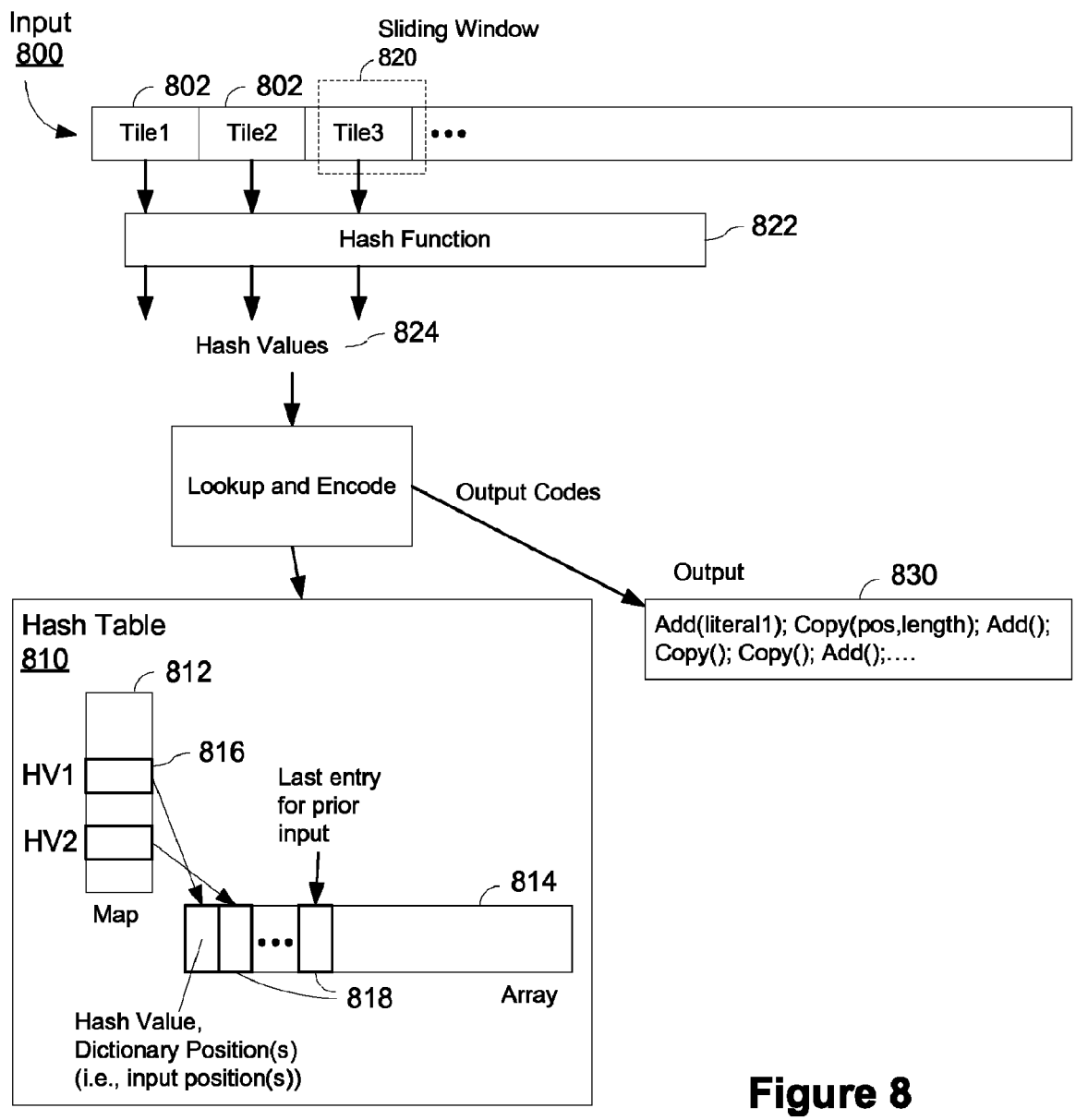
FIG. 8 is a conceptual block diagram of the Bentley-McIlroy data compression method.

FIG. 8 is a conceptual representation of the Bentley-McIlroy data compression method or process. The process compresses an input string 800, which is treated as a string of literal data values (e.g., a string of bytes or words, each of which can have any value). The base unit of information in the input string 800 may be a byte or a word of any suitable size, such as 4 bytes. In this example, the input is divided into tiles 802, and each tile is represented by an entry in a hash table 810. In this process, the input string 800 is considered to be the "dictionary" for the compression method, and the hash table is used to quickly find common strings in the input. For purposes of explaining the data compression process, we will assume the input string 800 includes multiple versions of the same web page, at least some of which contain large portions that are identical to other versions of the web page. If each version of the web page occupies thousand bytes of storage (e.g., 25,000 bytes), at least some of the matching common strings in the input string will be separated by distances of thousands of bytes.

In some embodiments, the tiles 802 are 32-bytes long and do not overlap. In other embodiments, the tiles are other sizes. Increasing the tile size reduces the chances of finding matches in small matching strings (strings of size less than twice the tile size), but decreases the number of hash table entries and decreases processing time.

The hash table 810 includes a map 812 and an array 814. Each entry 816 in the map 812 points to an entry 818 in the array 814. The map entries 816 are located at positions in the map 812 based on the hash value of the tile being added to the hash table 810. Array entries 818 are added sequentially to the array 814, so the location of last entry in the array 814 is known to the procedures used to access the hash table.

The input string 800 is processed from the beginning to the end, by sliding a virtual window 820 over the input string 800 and processing the input string at each position of the virtual window. The virtual window 820 is moved in predefined increments or units, such as one byte or one word. The window 820 has the same size (e.g., 32 bytes) as the tiles 802. Each time the virtual window 820 is moved, the input string portion in the window is mapped by a hash function 822 into a hash value 824. The hash value 824 has a predefined size, such as 32 bits. A lookup is performed on the hash value 814 to see if matching entry is found in the hash table. If so, a copy code is added to the output string 830. If the hash value 824 is not found in the hash table, the literal value at the beginning of the window is added to an "Add String".

When the virtual window 820 completely overlaps a tile, the hash table is updated to include either a new entry, or by updating an existing entry. If the map 812 does not include an entry 816 corresponding to the hash value of the current input sub-string (i.e., the portion of the input string in the virtual window 820), an entry 818 is added to the array and an entry 816 is added to the map that points to the new array entry 818. The array entry 818 stores the hash value, and a reference to the location of the input sub-string in the input string 800, which is also the current position of the virtual window 820. If the hash table already has an entry for the hash value of the current input sub-string, then that entry may be updated by adding a reference to the current position of the virtual window 820. In some embodiments, the number of input string positions indicated by any one hash table entry 816 is limited to a predefined number (e.g., 4, 8, 16 or 32), and a predefined rule is applied to determine which input string positions to keep in an entry and which to discard or not record.

The output string 830 contains a sequence of Add codes and Copy codes. Each Add code includes a sequence of one or more literal data values. Each Copy code specifies a range of locations in the input string that are to be duplicated or copied to produce a decoded portion of the input string 800. The Copy code may include a start position within the input string and a length, or it may indicate start and end positions. During decoding, the output string 830 of the compression process becomes the input string to the decoding process. Add codes are executed or decoded simply by adding the literal data values in the add code to a decoded output string. Copy codes are executed by copying the specified range of values from the decoded output string to the current endpoint of the decoded output string. Thus, during decoding, while decoding any copy code in the encoded data, the "dictionary" is the decoded version of all the Add and Copy codes preceding the Copy code currently being decoded.

Second Embodiment of Bentley-McIlroy-Based Compression Process

Figure 9A:
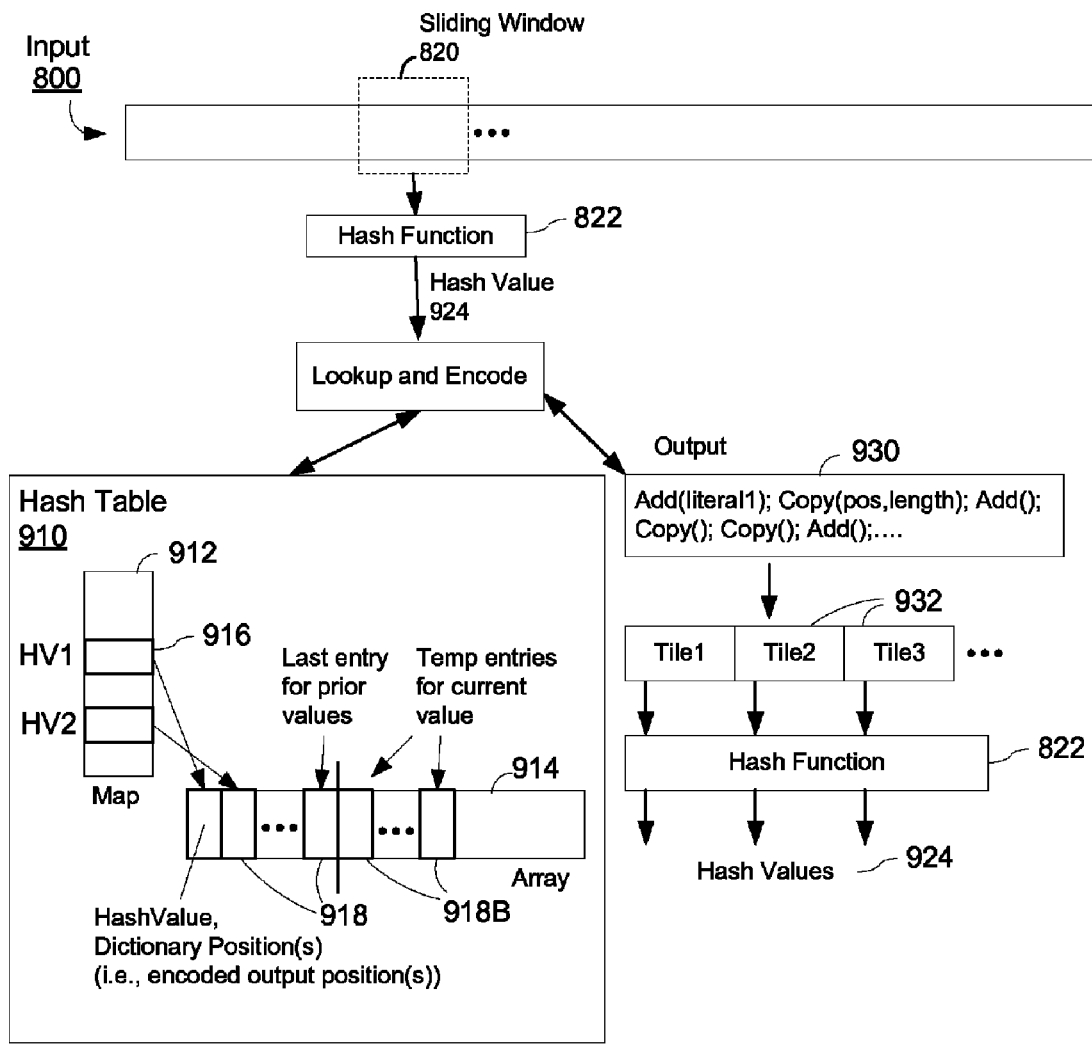
FIGS. 9A and 9B are conceptual block diagrams of a modified version of the Bentley-McIlroy data compression method, the output from which can be decoded without generating a hash table or dictionary.
Figure 9B:
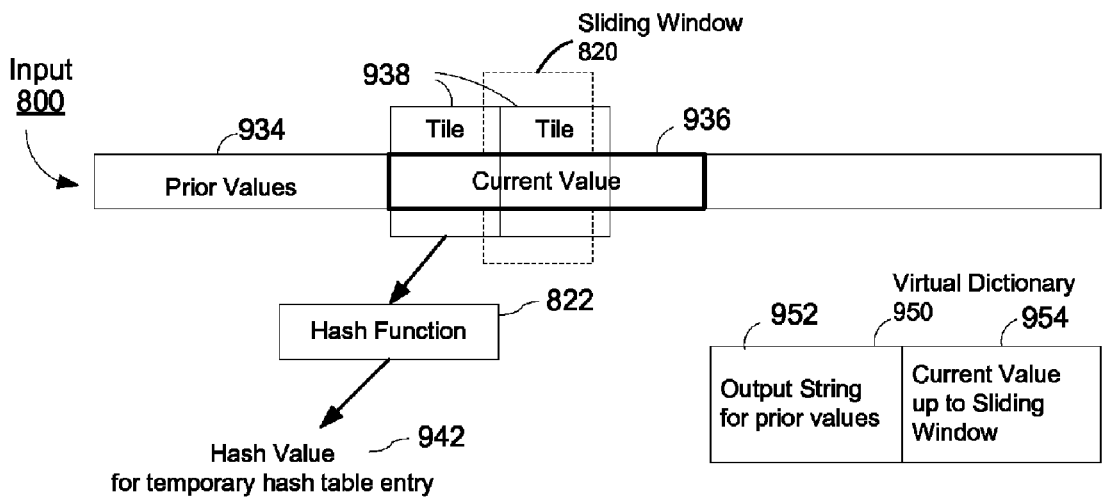

FIGS. 9A and 9B are a conceptual representation of another dictionary-based compression process that is somewhat similar to the Bentley-McIlroy data compression method or process. While similar data structures and processes are used, the content of the hash table 910, the output string 930 and the state of the "dictionary" are different.

As before, the process compresses an input string 800, which is treated as a string of literal data values. Further, the input string 800 is treated as a sequence of input values 936 (e.g., documents, web pages, or other values), each of which is a string of literal data values. In this process, the output string 930 is tiled, and tiles 932 of the output string 930 are hashed by the hash function 822 to produce the hash values 924 that are stored in a hash table 910. In some embodiments, the tiles 932 of the output string 930 are 32-bytes long and do not overlap. In other embodiments, the tiles are other sizes.

In this data compression process, the dictionary used by the compression process is a virtual dictionary 950, shown in FIG. 9B, formed by concatenating the output string 952 for all prior values 934 in the input string, and the portion 954 of the current value 936 ending at the current position of the sliding window.

The hash table 910 includes a map 912 and an array 914. Each entry 916 in the map 912 points to an entry 918 in the array 914. The map entries 916 are located at positions in the map 912 based on the hash value of the tile being added to the hash table 910. Array entries 918 are added sequentially to the array 914, so the location of last entry in the array 914 is known to the procedures used to access the hash table.

The input string 800 is processed from the beginning to the end, by sliding a virtual window 820 over the input string 800 and processing the input string at each position of the virtual window. The window 800 is moved in predefined increments or units, such as one byte or one word. The window has the same size (e.g., 32 bytes) as the tiles 932. Each time the virtual window 820 is moved, the input string portion in the window is mapped by a hash function 822 into a hash value 924. The hash value 924 has a predefined size, such as 32 bits. A lookup is performed on the hash value 924 to see if matching entry is found in the hash table 910. If so, a Copy code is added to the output string 930. If the hash value 924 is not found in the hash table 910, the literal value at the beginning of the window is added to an "Add String".

Whenever all the output codes (i.e., a sequence of one or more Add codes and/or Copy codes) for a current value 936 have been added to the output string 930, any new tiles 932 in the output string 930 are hashed by the hash function 822 to produce hash values 924. The hash table 910 is updated to include either a new entry, or by updating an existing entry. If the map 912 does not include an entry 916 corresponding to the hash value of a tile 932 in the output string, an entry 918 is added to the array and an entry 916 is added to the map that points to the new array entry 918. The array entry 918 stores the hash value, and a reference to the location of the tile 932 in the output string 930. If the hash table 910 already has an entry for the hash value 924 of the current tile 932, then that entry may be updated by adding a reference to the position of current tile 932. In some embodiments, the number of positions indicated by any one array entry 918 is limited to a predefined number (e.g., 4, 8, 16 or 32), and a predefined rule is applied to determine which input string positions to keep in an entry and which to discard or not record.

While processing a value 936 (e.g., a document, web page, or the like) in the input string, some of which can be very long, the current input value is tiled and temporary entries are added to the hash table 910 for those tiles 938. As shown in FIG. 9B, the tiles 938 of the current input value 936 are hashed by hash function 822 to produce hash values 942. Referring to FIG. 9A, array entries 918B are temporary entries created for the tiles 938 of the current input value. These temporary entries are located in the array 914 after the last hash table array entry for the prior encoded values, and they are deleted from the hash table 910 when compression of the current input value is completed. Thus, while scanning the sliding window over the current input value 936 in the input string 800, these additional hash table entries are used to find common strings within the current input value 936.

Copy codes produced as the result of matches with temporary entries 918 in the hash table reference a range of locations in the virtual dictionary 950 that are after the last location associated with the output string for prior values 952. During decompression these copy codes are recognized and are decoded by referencing the portion 954 of the virtual dictionary that comprises the portion of the current value that has already been decoded. In effect, there are two types of Copy codes: Copy codes that reference a range of positions in the output string 952, and Copy codes that reference earlier portions of the current value.

As in the first embodiment, the output string 930 contains a sequence of Add codes and Copy codes. Each Add code includes a sequence of one or more literal data values (e.g., a sequence of bytes or words, each of which can have any value). Each Copy code specifies a range of locations in the virtual dictionary 950 that are to be duplicated or copied to produce a decoded portion of the input string 800. The Copy code may include a start position within the virtual dictionary and a length, or it may indicate start and end positions. During decoding, the output string 930 of the compression process becomes the input string to the decoding process. Add codes are executed or decoded simply by adding the literal data values in the Add codes to a decoded output string. Copy codes are executed by copying the specified range of values from the virtual dictionary to the current endpoint of the decoded output string.

Compression Process

Figure 10:
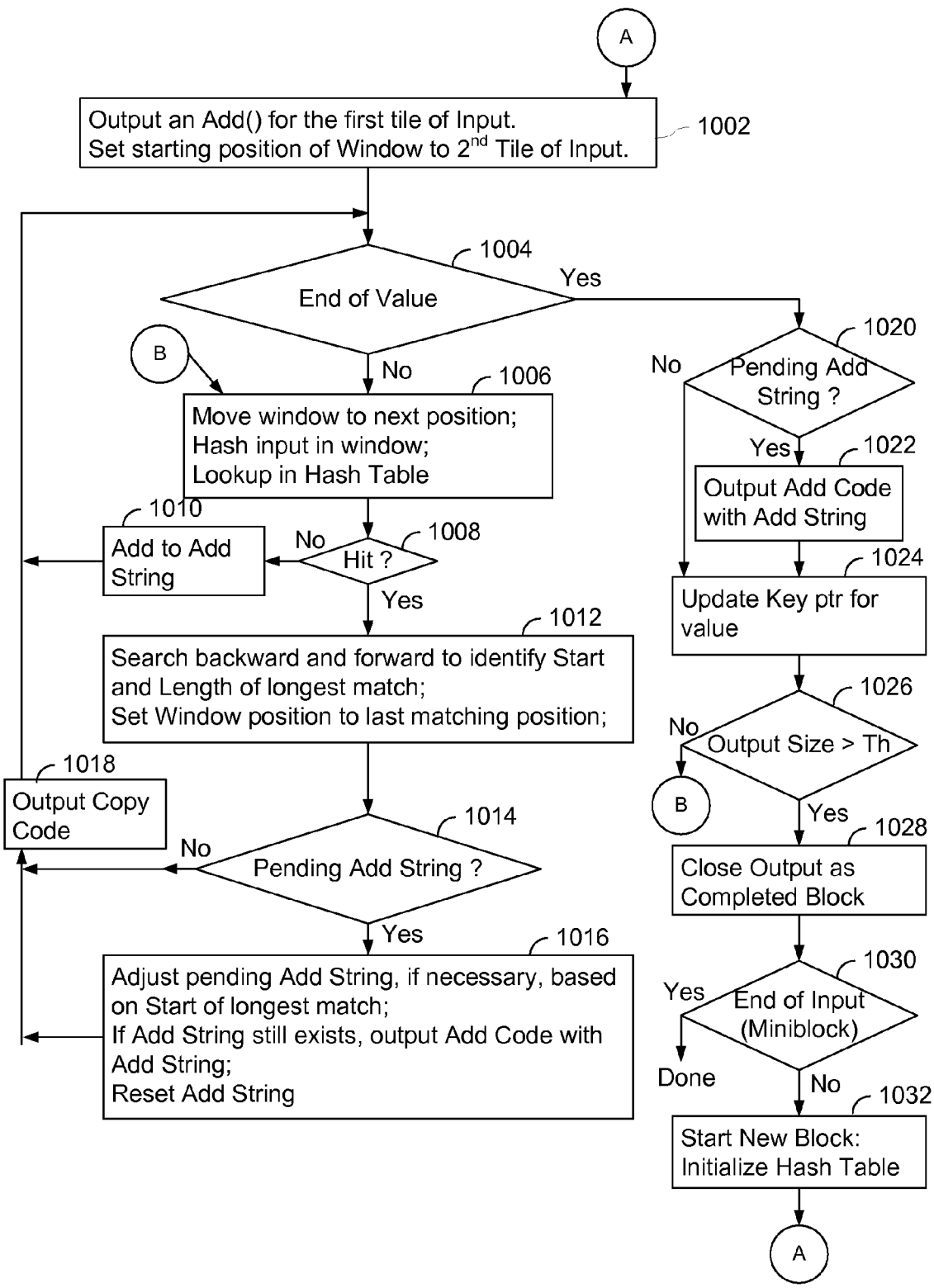
FIG. 10 is a flow chart of a data compression process compatible with the Bentley-McIlroy data compression method of FIG. 8 and the modified Bentley-McIlroy data compression method of FIGS. 9A and 9B.

Referring to FIG. 10, the dictionary-based compression process for compressing an input string of values begins by adding to the output string an Add code for the first tile of the input string (1002). In addition, the sliding window is positioned at the end of the first tile of the input string, in preparation for starting processing at the second tile of the input string.

If the process has not yet reached the end of a value (e.g., a value corresponding to a document, web page or the like) (1004—No), the sliding window is moved to a next position, the windowed input is hashed and a lookup is performed on the resulting hash value (1006). If a matching entry is not found in the hash table (1008—No), a unit (e.g., byte or word) of the input string is added to the pending Add String (1010) and the process continues at 1004. The "pending Add String" is a string of data from the input string which will be inserted into the output as an Add code, unless some or all of the Add String is found to match a string in the dictionary.

If a matching entry is found in the hash table (1008-Yes), the dictionary location or locations identified by the matching entry are searched backward and forward to find the longest matching string (1012). The sliding window is repositioned to the last matching position of the current input value. If there is no pending Add String (1014—No), a Copy code identifying the longest match is added to the output string (1018). If there is a pending Add String (1014-Yes), the Add String is adjusted, if necessary, to remove any portion covered by the identified longest matching string (1016). This can be determined, for instance, based on the Start position of the longest match. If an Add String still exists after any pruning, an Add Code with the remaining Add String is added to the output string, the Add String is reset (1016), and a Copy code identifying the longest match is added to the output string (1018). After the Copy code is output, the process resumes at 1004.

If the process has reached the end of a current input value 936 (e.g., a document, web page or the like)) (1004-Yes), a number of operations are performed. If there is a pending Add String (1020-Yes), an Add Code with the Add String is output (1020), which completes the output for the current input value. In some embodiments, the input values 936 belong to (e.g., are accessed as) key-value pairs, and a pointer or link for the key corresponding to the current input value 936 is updated to point to the set of output codes (i.e., a sequence of one or more Copy codes and/or Add codes) for the current input value (1024).

If the size of the output string does not exceed a threshold value (1026—no), processing continues with the next input value at 1006. Otherwise (1026—yes) the output string is closed and becomes a completed block of compressed data (1028). If the process has reached the end of the input string (1030—yes), the compression process is completed. Otherwise (1030—no), processing for a new block is initiated by starting a new block and re-initializing the hash table (1032), and then resuming the process at 1002. In this case, however, the "first tile of the input string" is the first tile of the remaining portion of the input string (i.e., after the last processed block).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing documents, comprising:
at a computer system comprising one or more processors and memory storing one or more programs for execution by the one or more processors so as to perform the method,
grouping a set of documents into a plurality of clusters, the set of documents comprising a sequence of tokens, wherein each cluster includes one or more documents in the set of documents;
generating a compressed representation of the set of documents from which respective documents in the set can be reconstructed, including generating, for the plurality of clusters, a compressed sequence of tokens by eliding duplicate sequences of tokens within respective clusters; and
generating an index of the compressed sequence of tokens, including indexing each respective token in the compressed sequence of tokens based on a respective token position of the respective token in the compressed sequence.

2. The method of claim 1, wherein generating the compressed sequence of tokens comprises:
encoding each cluster of documents into a respective cluster sequence of tokens, each cluster sequence of tokens including a set of document reconstruction data for reconstructing documents in the corresponding cluster; and
concatenating the respective cluster sequences of tokens into the compressed sequence of tokens.

3. The method of claim 2, wherein at least a subset of the clusters each have a single document; and
wherein the cluster sequences corresponding to the subset of the clusters that each have a single document precede, within the compressed sequence of tokens, the cluster sequences corresponding to respective clusters that each have a plurality of documents.

4. The method of claim 1, wherein generating the compressed sequence of tokens includes generating, for each cluster, document reconstruction data that comprises a sequence of add elements and copy elements, the add elements each indicating a string of tokens to be added to the compressed sequence of tokens and to a reconstruction of a corresponding document, and the copy elements each indicating a token position in the compressed sequence of tokens and a quantity of tokens to be copied from the compressed sequence of tokens, starting at the indicated token position, to the reconstruction of the corresponding document.

5. The method of claim 4, wherein the indicated quantity of tokens is at least a predefined count of tokens.

6. The method of claim 1, further comprising:
generating a token position mapping between corresponding tokens in the sequence of tokens and the compressed sequence of tokens.

7. The method of claim 1, wherein the grouping comprises grouping a plurality of versions in a document of the set of document together into a cluster.

8. The method of claim 1, wherein the grouping comprises:
ordering the set of documents based on an ordering of locators of the respective documents; and
grouping documents in the set of documents into clusters based on the ordering of locators.

9. The method of claim 1, wherein the grouping comprises grouping the set of documents into a plurality of clusters based on textual overlap between documents in the set of documents.

10. A system for processing documents, comprising:
one or more processors;
memory; and
one or more modules, wherein the modules are stored within memory and configured to be executed by the one or more processors, the one or more modules including instructions to:
group a set of documents into a plurality of clusters, the set of documents comprising a sequence of tokens, wherein each cluster includes one or more documents in the set of documents;
generate a compressed representation of the set of documents from which respective documents in the set can be reconstructed, including instructions to generate, for the plurality of clusters, a compressed sequence of tokens by eliding duplicate sequences of tokens within respective clusters; and
generate an index of the compressed sequence of tokens, including instructions to index each respective token in the compressed sequence of tokens based on a respective token position of the respective token in the compressed sequence.

11. The system of claim 10, wherein the grouping comprises grouping a plurality of versions of a document of the set of document together into a cluster.

12. The system of claim 10, wherein generating the compressed sequence of tokens comprises:
encoding each cluster of documents into a respective cluster sequence of tokens, each cluster sequence of tokens including a set of document reconstruction data for reconstructing documents in the corresponding cluster; and
concatenating the respective cluster sequences of tokens into the compressed sequence of tokens.

13. The system of claim 12, wherein at least a subset of the clusters each have a single document; and
wherein the cluster sequences corresponding to the subset of the clusters that each have a single document precede, within the compressed sequence of tokens, the cluster sequences corresponding to respective clusters that each have a plurality of documents.

14. The system of claim 10, wherein generating the compressed sequence of tokens includes generating, for each cluster, document reconstruction data that comprises a sequence of add elements and copy elements, the add elements each indicating a string of tokens to be added to the compressed sequence of tokens and to a reconstruction of a corresponding document, and the copy elements each indicating a token position in the compressed sequence of tokens and a quantity of tokens to be copied from the compressed sequence of tokens, starting at the indicated token position, to the reconstruction of the corresponding document.

15. The system of claim 14, wherein the indicated quantity of tokens is at least a predefined count of tokens.

16. The system of claim 10, the one or more modules further comprising instructions for generating a token position mapping between corresponding tokens in the sequence of tokens and the compressed sequence of token.

17. The system of claim 10, wherein the grouping comprises grouping a plurality of versions of a document of the set of document together into a cluster.

18. The system of claim 10, wherein the instructions to group the set of documents comprises instructions to:
order the set of documents based on an ordering of locators of the respective documents; and
group the documents into clusters based on the ordering of locators.

19. The system of claim 10, the instructions to group the set of documents comprises instructions to group the set of documents into a plurality of clusters based on textual overlap between the documents.

20. A non-transitory computer readable storage medium storing one or more programs, the one or more programs comprising instructions which, when executed by a computer system having one or more processors and memory, cause the computer system to:
  group a set of documents into a plurality of clusters, the set of documents comprising a sequence of tokens, wherein each cluster includes one or more documents in the set of documents;
  generate a compressed representation of the set of documents from which respective documents in the set can be reconstructed, including instructions to generate, for the plurality of clusters, a compressed sequence of tokens by eliding duplicate sequences of tokens within respective clusters; and
  generate an index of the compressed sequence of token, including instructions to index each respective token in the compressed sequence of tokens based on a respective token position of the respective token in the compressed sequence.

21. The computer readable storage medium of claim 20, wherein the instructions to group the set of documents comprises instructions to group a plurality of versions of a document in the set of documents together into a cluster.

22. The computer readable storage medium of claim 20, wherein generating the compressed sequence of tokens comprises:
  encoding each cluster of documents into a respective cluster sequence of tokens, each cluster sequence of tokens including a set of document reconstruction data for reconstructing documents in the corresponding cluster; and
  concatenating the respective cluster sequences of tokens into the compressed sequence of tokens.

23. The computer readable storage medium of claim 22, wherein at least a subset of the clusters each have a single document; and
  wherein the cluster sequences corresponding to the subset of the clusters that each have a single document precede, within the compressed sequence of tokens, the cluster sequences corresponding to respective clusters that each have a plurality of documents.

24. The computer readable storage medium of claim 20, wherein generating the compressed sequence of tokens includes generating, for each cluster, document reconstruction data that comprises a sequence of add elements and copy elements, the add elements each indicating a string of tokens to be added to the compressed sequence of tokens and to a reconstruction of a corresponding document, and the copy elements each indicating a token position in the compressed sequence of tokens and a quantity of tokens to be copied from the compressed sequence of tokens, starting at the indicated token position, to the reconstruction of the corresponding document.

25. The computer readable storage medium of claim 24, wherein the indicated quantity of tokens is at least a predefined count of tokens.

26. The computer readable storage medium of claim 20, further comprising instructions to generate a token position mapping between corresponding tokens in the sequence of tokens and the compressed sequence of tokens.

27. The computer readable storage medium of claim 11, wherein the instructions to group the set of documents comprises instructions to:
  order the set of documents based on an ordering or locators of the respective documents; and
  group documents in the set of documents into clusters based on the ordering of locators.

28. The computer readable storage medium of claim 11, wherein the instructions to group the set of documents comprises instructions to group the set of documents into a plurality of clusters based on textual overlap between documents in the set of documents.

29. A system for processing documents, comprising:
  one or more processors;
  memory storing one or more programs executed by the one or more processors;
  means for grouping a set of documents into a plurality of clusters, the set of documents comprising a sequence of tokens, wherein each cluster includes one or more documents in the set of documents;
  means for generating a compressed representation of the set of documents from which respective documents in the set can be reconstructed, including means for generating, for the plurality of clusters, a compressed sequence of tokens by eliding duplicate sequences of tokens within respective clusters; and
  means for generating an index of the compressed sequence of token, including means for indexing each respective token in the compressed sequence of tokens based on a respective token position of the respective token in the compressed sequence.

30. A method of processing a query, comprising:
  at a computer system including one or more processors and memory storing one or more programs for execution by the one or more processors so as to perform the method,
  receiving a query, the query comprising one or more tokens;
  identifying, in a compressed sequence of tokens that includes a plurality of cluster subsequences, each cluster subsequence corresponding to a respective cluster of documents, one or more cluster subsequences that each include at least one of the query tokens, wherein the compressed sequence of tokens includes respective cluster subsequences from which duplicate sequences of tokens have been elided;
  for at least one respective cluster subsequence of the identified cluster subsequences, identifying one or more documents within the respective cluster subsequence that satisfy the query; and
  returning the identified documents as matches to the query.

31. The method of claim 30, wherein the query includes a Boolean AND expression that includes two or more of the query tokens; and
  identifying cluster subsequences comprises identifying in the compressed sequence of tokens one or more cluster subsequences that each include all of the query tokens.

32. The method of claim 30, wherein the query includes a Boolean OR expression that includes two or more of the query tokens.

33. The method of claim 30, wherein the query comprises a Boolean expression that includes of two or more of the query tokens; and
  identifying cluster subsequences comprises identifying in the compressed sequence of tokens one or more cluster subsequences that satisfy the Boolean expression.

34. The method of claim 30, wherein the query includes an exact phrase query;
  identifying cluster subsequences comprises identifying in the compressed sequence of tokens one or more cluster subsequences that each include all of the query tokens; and
  identifying one or more documents within the respective cluster subsequence comprises identifying one or more documents within the respective cluster subsequence that include all of the query tokens in an order as specified in the query.

35. A system for processing a query, comprising:
one or more processors;
memory; and
one or more modules, wherein the modules are stored within memory and configured to be executed by the one or more processors, the one or more modules including instructions to:
  receive a query, the query comprising one or more tokens;
  identify, in a compressed sequence of tokens that includes a plurality of cluster subsequences, each cluster subsequence corresponding to a respective cluster of documents, one or more cluster subsequences that each include at least one of the query tokens, wherein the compressed sequence of tokens includes respective cluster subsequences from which duplicate sequences of tokens have been elided;
  identify, for at least one respective cluster subsequence of the identified cluster subsequences, one or more documents within the respective cluster subsequence that satisfy the query; and
  return the identified documents as matches to the query.

36. The system of claim 35, wherein the query includes a Boolean AND expression that includes two or more of the query tokens; and
  identifying cluster subsequences comprises identifying in the compressed sequence of tokens one or more cluster subsequences that each include all of the query tokens.

37. The computer readable storage medium of claim 35, wherein the query comprises a Boolean expression that includes of two or more of the query tokens; and
  identifying cluster subsequences comprises identifying in the compressed sequence of tokens one or more cluster subsequences that satisfy the Boolean expression.

38. The system of claim 35, wherein the query includes an exact phrase query;
  identifying cluster subsequences comprises identifying in the compressed sequence of tokens one or more cluster subsequences that each include all of the query tokens; and
  identifying one or more documents within the respective cluster subsequence comprises identifying one or more documents within the respective cluster subsequence that include all of the query tokens in an order as specified in the query.

39. The system of claim 35, wherein the query includes a Boolean OR expression that includes two or more of the query tokens.

40. A non-transitory computer readable storage medium storing one or more programs, the one or more programs comprising instructions which, when executed by a computer system having one or more processors and memory, cause the computer system to:
  receive a query, the query comprising one or more tokens;
  identify, in a compressed sequence of tokens that includes a plurality of cluster subsequences, each cluster subsequence corresponding to a respective cluster of documents, one or more cluster subsequences that each include at least one of the query tokens, wherein the compressed sequence of tokens includes respective cluster subsequences from which duplicate sequences of tokens have been elided;
  for at least one respective cluster subsequence of the identified cluster subsequences, identify one or more documents within the respective cluster subsequence that satisfy the query; and
  return the identified documents as matches to the query.

41. The computer readable storage medium of claim 40, wherein the query includes a Boolean AND expression that includes two or more of the query tokens; and
  identifying cluster subsequences comprises identifying in the compressed sequence of tokens one or more cluster subsequences that each include all of the query tokens.

42. The computer readable storage medium of claim 40, wherein the query includes a Boolean AND operation on two or more of the query tokens; and
  identifying cluster subsequences comprises identifying in the compressed sequence of tokens one or more cluster subsequences that each include all of the query tokens.

43. The computer readable storage medium of claim 40, wherein the query includes an exact phrase query;
  identifying cluster subsequences comprises identifying in the compressed sequence of tokens one or more cluster subsequences that each include all of the query tokens; and
  identifying one or more documents within the respective cluster subsequence comprises identifying one or more documents within the respective cluster subsequence that include all of the query tokens in an order as specified in the query.

44. The computer readable storage medium of claim 40, wherein the query includes a Boolean OR expression that includes two or more of the query tokens.

45. A system for processing a query, comprising:
one or more processors;
memory storing one or more programs executed by the one or more processors;
means for receiving a query, the query comprising one or more tokens;
means for identifying, in a compressed sequence of tokens that includes a plurality of cluster subsequences, each cluster subsequence corresponding to a respective cluster of documents, one or more cluster subsequences that each include at least one of the query tokens, wherein the compressed sequence of tokens includes respective cluster subsequences from which duplicate sequences of tokens have been elided;
means for identifying, for at least one respective cluster subsequence of the identified cluster subsequences, one or more documents within the respective cluster subsequence that satisfy the query; and
means for returning the identified documents as matches to the query.

* * * * *

UNITED STATES PATENT AND TRADEMARK OFFICE
CERTIFICATE OF CORRECTION

| | | |
|---|---|---|
| PATENT NO. | : 8,175,875 B1 | Page 1 of 1 |
| APPLICATION NO. | : 11/419423 | |
| DATED | : May 8, 2012 | |
| INVENTOR(S) | : Dean et al. | |

It is certified that error appears in the above-identified patent and that said Letters Patent is hereby corrected as shown below:

In Column 15, line 57, please delete "of the set" and add -- in the set --;
In Column 15, line 58, please delete "document" and add -- documents --;
In Column 16, line 24, please delete "of the set" and add -- in the set --;
In Column 16, line 25, please delete "document" and add -- documents --;
In Column 16, line 58, please delete "token" and add -- tokens --;
In Column 16, line 60, please delete "of the set" and add -- in the set --;
In Column 16, line 61, please delete "document" and add -- documents --;
In Column 16, line 66, please delete "the documents" and add -- documents in the set of documents --;
In Column 17, line 4, please delete "the documents" and add -- documents in the set of documents --;
In Column 17, line 21, please delete "token" and add -- tokens --;
In Column 18, line 29, please delete "token" and add -- tokens --;
In Column 18, line 42, please delete "cluster of documents" and add -- cluster of one or more documents --;
In Column 19, line 25, please delete "cluster of documents" and add -- cluster of one or more documents --;
In Column 19, line 42, please delete "computer readable storage medium" and add -- system --;
In Column 20, lines 7-8, please delete "cluster of documents" and add -- cluster of one or more documents --;
In Column 20, line 24, please delete "includes a Boolean AND operation" and add -- comprises a Boolean expression that includes --;
In Column 20, line 28, please delete "each include all of the query tokens" and add -- satisfy the Boolean expression --;
In Column 20, lines 51-52, please delete "cluster of documents" and add -- cluster of one or more documents --.

Signed and Sealed this
Eighteenth Day of September, 2012

David J. Kappos
*Director of the United States Patent and Trademark Office*